Dec. 8, 1925.
F. B. KANE
1,564,961
TRAILER DRAFT GEAR FOR AUTOMOBILES
Filed April 7, 1924
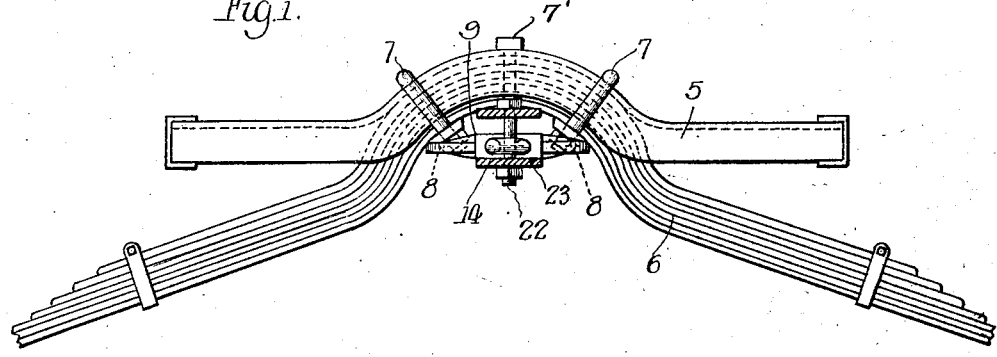
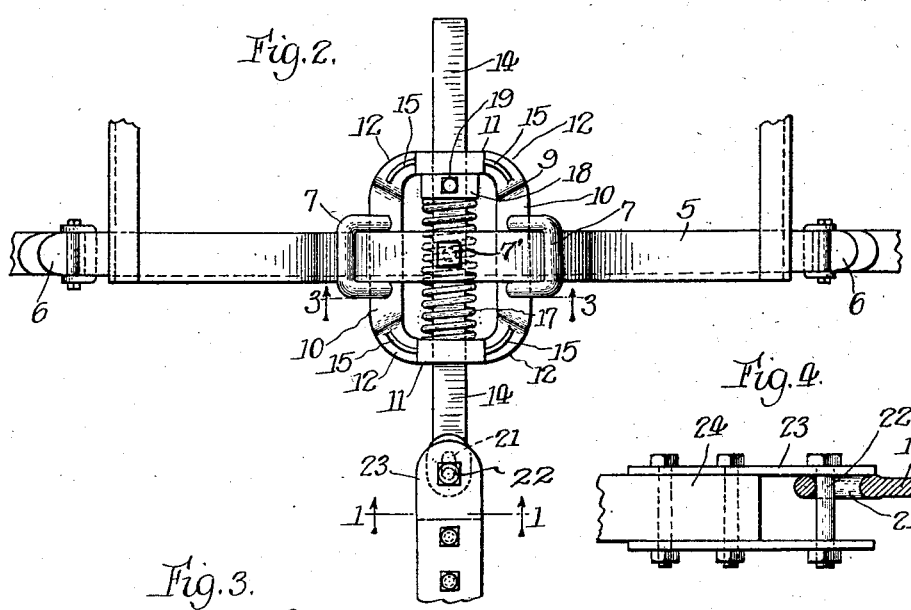
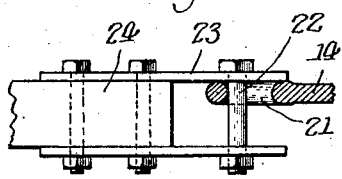
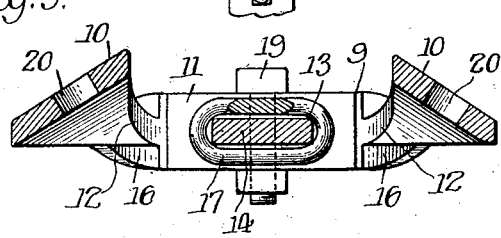
Witness:
A. J. Sauser.
Inventor:
Frank B. Kane,
By Samuel N. Pond Atty.

Patented Dec. 8, 1925.

1,564,961

UNITED STATES PATENT OFFICE.

FRANK B. KANE, OF REDDICK, ILLINOIS.

TRAILER DRAFT GEAR FOR AUTOMOBILES.

Application filed April 7, 1924. Serial No. 704,563.

*To all whom it may concern:*

Be it known that I, FRANK B. KANE, a citizen of the United States, residing at Reddick, in the county of Kankakee and State of Illinois, have invented certain new and useful Improvements in Trailer Draft Gears for Automobiles, of which the following is a specification.

This invention relates to improvements in draft gears, and has reference more particularly to a draft gear for automobile trailers. Among the objects of the invention, are to provide an improved trailer draft gear which will provide an elastic or yielding pull on the trailer, thereby avoiding the effects of shocks and the consequent danger of breakage which attend the use of rigid draft connections, to provide an improved draft gear which will afford a universal flexible connection between the draft bar and pole of the trailer so as to avoid strain or breakage under vibrations of the draw bar and trailer pole, to provide a trailer draft rigging applicable to automobiles, such as the Ford, having a rear transverse frame member or saddle bar and spring which will utilize the standard U-bolts or spring clips for fastening the draft rigging in place, without requiring any other or special fastening means, and, in general, to provide a simple, inexpensive, and easily attached draft rigging for automobiles and motor vehicles of the type mentioned. Other objects and attendant advantages of the invention will be apparent to persons skilled in the art as the same becomes better understood by reference to the following detailed description, taken in connection with the accompanying drawings wherein I have illustrated a practical and preferred embodiment of the invention, and in which—

Fig. 1 is a rear elevation of the rear transverse frame bar and spring of an automobile of the Ford type, showing my improved trailer draft rigging attached thereto through the agency of the spring clips or U-bolts which are employed to fasten the spring to the frame bar; the pole of the trailer coupled to the rear end of the draft bar appearing in section on the line 1—1 of Fig. 2;

Fig. 2 is a top plan view of the parts shown in Fig. 1;

Fig. 3 is an enlarged transverse section on the line 3—3 of Fig. 2, with the spring and spring clips omitted; and Fig. 4 is a side elevation, enlarged, showing the flexible connection between the draw bar and trailer pole.

Referring to the drawing, 5 designates the rear transverse chassis frame member of an automobile of the Ford type, and 6 the rear transverse spring attached to the frame member 5 by the spring clips or U-bolts 7 and center bolt 7'. In standard construction, the limbs of the U-bolts 7 at their lower ends pass through a connecting strip which is clamped hard against the lower side of the spring by the U-bolt nuts 8. In the application of my device to the spring and rear frame member these connecting strips are dispensed with and replaced by the longitudinal sides of the frame of the draft rigging, as more particularly hereinafter explained.

Referring now to the structure of the draft rigging itself, 9 designates as an entirety a generally rectangular frame member comprising parallel longitudinal limbs 10, parallel transverse limbs 11, and curved connecting portions 12 at the four corners. The transverse end limbs 11 are thicker than the longitudinal limbs 10 and are formed with substantially rectangular central transverse slots 13 (Fig. 3) to accommodate the sliding movement of the draw bar 14 mounted therein. By reference to Fig. 3 it will be observed that the longitudinal limbs 10 are warped out of the general plane of the frame to fit the inclination of the lower side of the spring 6 at the points of the latter which are engaged by the clips 7; and for increased strength, the corner portions 12 of the frame are formed with upper and lower longitudinal reinforcing ribs 15 and 16, respectively.

The draw bar 14 extends through both end members 11 of the frame and, within the latter, is encircled by a stiff flat coil spring 17, one end of which abuts against the rear end frame member 11, and the other end against a collar 18 fastened to the draw bar by a bolt 19. The longitudinal limbs 10 are each formed with a pair of holes 20 of proper size and properly spaced to receive the limbs of the U-bolts 7, whereby, when the nuts 8 are applied and turned up hard, the device is very rigidly and securely attached to the rear frame member and spring.

The rear end of the draw bar 14 is formed with a longitudinal slot 21, best shown in Fig. 4, to receive a vertical bolt 22 that is passed through the forward end of a clevis 23 attached to the pole 24 of the trailer and straddling the rear slotted end of the draw bar 14. The upper and lower limbs of the clevis are spaced apart a distance greater than the thickness of the draw bar, and the pin or bolt 22 has a free fit in the slot 21, the latter being of considerably greater length than the diameter of the bolt. By reason of this construction a connection is provided which allows for independent vertical and lateral vibrations of the draw bar and pole without imposing any strain on the parts thereof.

From the foregoing it will be apparent that, for the attachment of the device to the rear end of an automobile of the character shown, all that is necessary is to withdraw the nuts 8 and the usual clamping strips which connect the legs of the U-bolts and take the thrust of the nuts, partially retract the bolts, set the yoke or frame 9 in position beneath the spring with the holes 20 alined with the legs of the U-bolts, pass the latter downwardly through the holes 20, and reapply and tighten up the nuts 8. No additional or special fastening means are required, the spring clips 7 which are standard equipment on the automobile being all that is necessary. By extending the draw bar 14 through both the front and rear limbs 11 of the yoke the effect of an extended bearing of the draw bar is obtained, insuring its movement under the pull of the load in a rectilinear path. The spring 17 serves to cushion the shocks when starting under load, and thereby eases the strain on the parts to which the device is attached and reduces the liability of bending the frame member 5. Substantially one longitudinal half of the device is located under the body of the car and within the chassis frame where it is out of the way and protected from accidental injury. Moreover, the device consists of few parts which can be cheaply manufactured and assembled, and by its described mode of attachment avoids a pull on the rear axle of the car which is undesirable on account of the danger of throwing the transmission mechanism out of accurate working relation.

While I have herein shown and described one simple and practical embodiment of the principle of the invention, it is manifest that minor changes in the detail forms and arrangements of the parts may be resorted to without departing from the principle of the invention or sacrificing any of the advantages thereof. Hence, I reserve such variations and modifications and mechanical equivalents as fall within the spirit and purview of the appended claims.

I claim—

1. A trailer draft gear for automobiles, comprising, in combination, a generally rectangular yoke adapted for attachment to and beneath the rear transverse spring of an automobile, a draw-bar slidably mounted in the front and rear limbs of said yoke, a spring encircling said draw-bar and abutting at one end against said yoke, and means fast on said draw-bar forming an abutment for the other end of said draw-bar spring.

2. A trailer draft gear for automobiles, comprising, in combination, a generally rectangular yoke having slotted end limbs, an apertured side limbs adapted to fit against the under side of the rear transverse spring of an automobile, a draw-bar slidably mounted in the slots of said end limbs, a coil compression spring encircling said draw-bar within said yoke and abutting at one end against the rear end limb of the latter, a collar fast on said draw-bar forming an abutment for the other end of said draw-bar spring, and means engaged with the apertures of said side limbs for clamping said yoke to said automobile spring.

3. A trailer draft gear for automobiles, comprising in combination, a generally rectangular yoke having centrally slotted end limbs and transversely inclined side limbs adapted to transversely underlie and fit against the central bowed portion of the rear transverse spring of an automobile, a draw-bar slidably mounted in the slots of said end limbs, a coil compression spring encircling said draw-bar within said yoke and abutting at one end against the rear end limb of the latter, a collar keyed on said draw-bar forming an abutment for the other end of said draw-bar spring, and means for clamping said side limbs to said automobile spring.

4. A trailer draft gear for automobiles, comprising, in combination, a generally rectangular one-piece yoke having centrally slotted end limbs and transversely inclined apertured side limbs adapted to transversely underlie and fit against the central bowed portion of the rear transverse spring of an automobile, a draw-bar slidably mounted in the slots of said end limbs, a coil compression spring encircling said draw-bar within said yoke and abutting at one end against the rear end limb of the latter, a collar keyed on said draw-bar forming an abutment for the other end of said draw-bar spring, and a pair of U-bolts embracing said automobile spring and passed through the apertures of said side limbs and clamping the latter to said automobile spring.

FRANK B. KANE.